United States Patent [19]

Warren et al.

[11] Patent Number: 5,651,007

[45] Date of Patent: *Jul. 22, 1997

[54] SYSTEM OF HIGH AVAILABILITY SYNCHRONOUS BANDWIDTH ALLOCATION OVER FDDI

[75] Inventors: Jeffrey R. Warren, Apex, N.C.; Eric Lebrun, Saint-Jeannet, France; Frederic Raimbault, Nice, France; Pascal Francois, Vence, France

[73] Assignee: International Business Machines Corporation, Armonk, N.Y.

[ * ] Notice: The term of this patent shall not extend beyond the expiration date of Pat. No. 5,548,579.

[21] Appl. No.: 351,859

[22] Filed: Dec. 7, 1994

[30] Foreign Application Priority Data

Dec. 8, 1993 [EP] European Pat. Off. .............. 93480221

[51] Int. Cl.$^6$ .......................................................... H04L 1/22
[52] U.S. Cl. ............................................. 370/431; 370/468
[58] Field of Search ........................... 370/85.1, 84, 85.5, 370/85.4, 85.13, 85.14, 85.15, 16, 16.1, 17, 118, 58.3, 431, 437, 468; 340/825.05, 827, 825.03, 825.06; 395/181, 182.01, 182.02, 182.08, 182.09

[56] References Cited

U.S. PATENT DOCUMENTS

| | | | |
|---|---|---|---|
| 4,979,167 | 12/1990 | McCool | 370/85.7 |
| 5,136,581 | 8/1992 | Muehrcke | 370/58.1 |
| 5,337,311 | 8/1994 | Herzberg et al. | 370/85.7 |

*Primary Examiner*—Douglas W. Olms
*Assistant Examiner*—Ajit Patel
*Attorney, Agent, or Firm*—Gerald R. Woods

[57] ABSTRACT

A system of high availablity synchronous bandwidth allocation comprising an FDDI segment to which are connected a first device for allocating synchronous bandwidth over the FDDI segment to any requesting device, and at least a second device for requesting synchronous bandwidth over the FDDI segment. The first device and a third device also connected to said FDDI segment, are capable of a exchanging information regarding the allocation of synchronous bandwidth to at least the second device, the third device can take over for the first device as synchronous bandwidth allocator, if the first device fails.

5 Claims, 10 Drawing Sheets

FDDI Frame

| PA | SD | FC | DA | SA | Information | FCS | ED | FS |

| | |
|---|---|
| PA | Preamble - used for clock synchronization - 64 bits |
| SD | Starting Delimiter |
| FC | Frame Control |
| DA | Destination Address |
| SA | Source Address |
| FCS | Frame Check Sequence - 32 bit result of a CRC check |
| ED | Ending Delimiter |
| FS | Frame Status - address recognized, frame copied and error detected bits |
| SFS | Starting Frame Sequence |
| EFS | Ending Frame Sequence |

FDDI Token

| PA | SD | FC | ED |

FIG. 4 (PRIOR ART)

SYSTEM OF HIGH AVAILABILITY SYNCHRONOUS BANDWIDTH ALLOCATION OVER FDDI

The present invention relates to the data communication field and more particularly to a system of high availability of synchronous bandwidth allocation over FDDI.

BACKGROUND ART

The availability of Fiber Distributed Data Interface (FDDI) networks is of great interest in the telecommunication field. Telecommunication users are sensitive to response time and the guaranteed bandwidth involved in their communications through the network especially when the communications are exchanged between multimedia applications; i.e., the possibility for an Client/Server application to transmit and receive multimedia data through a telecommunication network at any instant and without delay (that is, synchronous data traffic).

Such requirements imply that the telecommunication network must be able to manage the available bandwidth and response time which are subject to change in the telecommunication network and which may degrade the telecommunication.

A Fiber Distributed Data Interface system can have dual counter-rotating fiber-optic rings operating at 100 Mega-bits per second. Fiber Distributed Data Interface uses a token-passing protocol, with each station having the chance to transmit frames when a token passes. Fiber Distributed Data Interface uses two rings, one called the PRIMARY ring arid the other the SECONDARY ring. The primary ring may be likened to the main-ring path, with the secondary ring acting as the backup ring path. Stations, if attaching directly, can attach to either or both of these rings. In order to differentiate between stations that attach to one or both rings, two classes of stations are defined. A CLASS A station attaches to both of the rings directly, while CLASS B stations attach to one of the rings.

One of the prime requirements for FDDI is a high-speed establishment backbone to interconnect heterogeneous Local Area Networks. To this end, the FDDI and LAN design must have reliability and capacity built in. Attachment cost does not have to be so carefully limited, since most of the cheaper stations, would be connected to the lower speed LANs that are themselves bridged to the FDDI backbone. FDDI has satisfied these requirements by:

Operating at a data rate of 100 Mega-bits per second, providing high capacity.

Having a dual optical fiber ring configuration, that can be reconfigured by the class A stations in the event of a failure. This provides reliability and recovery.

Allowing stations to attach to both of the rings or only one.

The American National Standards Institute, in defining and developing the FDDI standard, was able to make much use of the work already done by the Institute of Electrical and Electronic Engineers. To this extent, they used a similar model for the layering of the protocols. The structure is shown in FIG. 3. The FDDI standard assumes the use of the IEEE 802.2 logical link standard; it does not attempt to define it as part of FDDI.

Medium Access Control (MAC):

In this layer, Fiber Distributed Data Interface borrows very extensively from the techniques used by IEEE, particularly the 2.5 token-ring specification. The FDDI MAC is a part of International Standard Organization 9314: ISO 9341-2. When a station wishes to transmit a frame, it must wait for a token to arrive. The token is removed from the ring by the transmitting station before actual frame transmission begins.

The frame size on a Fiber Distributed Data Interface Local Area Network is limited by clocking constraints to 4500 bytes. At the Fiber Distributed Data Interface data rate, and given the fact that a Fiber Distributed Data Interface can be physically very large, it is extremely likely that the frame will be physically shorter than the length of the ring. The frame and token structure on an Fiber Distributed Data Interface Local Area Network is shown in FIG. 4.

Allocating FDDI Capacity:

Because the token is always released before the frame header has returned, the priority reservation scheme that is used in the token-ring architecture to give stations priority access to the ring cannot work in FDDI. Additionally, FDDI is designed to give far greater control over the use of the ring capacity to connecting stations. The mechanism that is used is heavily dependent on timers within each station. FDDI defines two classes of traffic:

SYNCHRONOUS for which a guaranteed bandwidth is required; that is a station must gain access to the ring, and transmit its frames within a specified time period.

ASYNCHRONOUS traffic will only be transmitted when the load on the ring drops below a specified level. Such traffic might be file transfer where overall access or response time is not quite such an issue.

To control the amount of each kind of traffic that can be transmitted by a station, FDDI implements a timer token access protocol. Stations expect to see a token within a specified time interval. This interval is known as the target token rotation time (TTRT). All stations have the same value for the target token rotation time set within them. The value is determined when a station initializes itself on the ring.

Each station measures the time between successive appearances of a token. The station uses a token rotation timer (TRT) to do this. When a token passes a station, the token rotation timer is set to the value of the target token rotation time and starts to count down. If the target rotation timer expires before the next token is seen, a counter called the late counter is incremented. The token is said to be late. Under normal circumstances, the token should reappear within the target time. The token is then said to be early. Each time a station sees a token, three things happen:

The station may start to transmit synchronous frames.

If the token rotation timer has not expired, that is the token was early, the remaining time is stored in the token holding timer(THT). The THT is therefore the amount of time by which the token was early.

The token rotation timer is reset to the value of target token rotation time and allowed to start running down again.

The station is allowed to transmit synchronous frames until a time allocated for synchronous data transmission expires (the synchronous allocation timer). This timer value may be different at each station, but the sum value of all the synchronous allocation timers on active stations must always be slightly less than the TTRT. It is up to the station management protocols to make sure that this is so.

When the timer expires, or all synchronous frames are transmitted, the station may be allowed to transmit asynchronous frames. The decision is based on the value of the late count. If the count is at zero, asynchronous frames can be transmitted for the length of time that was stored in the TTRT. When this timer runs down to zero, transmission must stop, and a token must be released.

Meanwhile, the TRT is steadily running down. It has been doing so during both synchronous and asynchronous transmission. If both of these transmissions were stopped because of timer expiration (token holding and synchronous allocation) and assuming that other stations have frames to send, the TRT will almost certainly expire before the token is seen again. The token is late; the late counter will be incremented, there will be no value to put in the TTRT, and the station will not be allowed to send any asynchronous frames the next time it does see the token. In a way, the station has paid a penalty for having had so much traffic to send. This penalty only applies to asynchronous traffic however; a station may always transmit synchronous traffic when it sees a token.

When the token next arrives early, the late counter is decremented. When the value gets to zero, the station will be able to transmit asynchronous traffic once more.

When this operation is considered across all stations on the ring, the capacity allocation algorithm is attempting to keep the actual token rotation time less than the target. Since synchronous traffic can always be sent, the mechanism guarantees an amount of bandwidth to the synchronous traffic. Asynchronous traffic is only sent when there is spare capacity on the LAN, and fairness of station access is maintained.

Using this mechanism, a FDDI network is able to cope with traffic needing a defined amount of Synchronous Bandwidth (i.e. multimedia traffic), and also support the burst traffic whose response time requirement is less defined.

Physical Protocol (PHY):

As in the IEEE standards, the physical layer specifies the signalling rate, encoding and clocking of the LAN. For FDDI the data rate on the ring is 100 Mega-bits per second. The Fiber Distributed Data Interface Physical Protocol is a part of International Standards Organization 9314: ISO9341-1

Physical Medium Dependent (PMD):

This layer is used to specify the fiber type and size used by FDDI, the connectors, and the wavelength of the light beam that is transmitted down the fiber. The Fiber Distributed Data Interface Physical Medium Dependent is a part of International Standard Organization 9314: ISO9341-3

Station Management (SMT): This layer defines the protocols that stations use to intercommunicate, so as to set their timers; the target token rotation timer or their synchronous allocation timers for example. Without a consistent set of protocols which are used by all stations that attach to the ring(s), it is impossible for FDDI to deliver the function, capacity and performance for which it was designed. The FDDI Station Management is a part of American National Standards Institute X3T9: ANSI X3T9-5.

Station Management provides a number of Frame-Based services and functions that may be used by higher-level functions to gather information about and exercise control over the attached FDDI network. A number of the Station Management frame protocols are request-response frame protocols. These protocols are carried out between a single requester and one or more responders, depending on the addressing mode of the request frame.

NEIGHBOR NOTIFICATION This protocol performs the following functions:

It determines a logical upstream neighbor address and its logical downstream neighbor address.

It detects a duplicated address on an operational FDDI ring.

It generates a periodic frame handshake that verifies the operation of the local station.

The protocol performs these functions by periodically initiating a request-response frame exchange between a station and its nearest downstream neighbor. The frames used are the Station Management Neighbor Information Frames.

Status Report Protocol A station performs the Status Report Protocol to periodically announce Station Status that is useful in managing an FDDI network. This status information is carried in Status Report frames.

Parameter Management Protocol This protocol performs the remote management of station attributes. It is accomplished via Parameter Management frames. The Parameter Management prtocol operates on all Station Management Management Information Base MIB) attributes, attribute groups and actions.

STATION STATUS POLLING A mechanism is provided for aggregate Station Status to be obtained remotely through a polling (request/response) protocol. This protocol is carried out using the Status Information frame.

ECHO PROTOCOL This protocol is provided for station-to-station loopback testing on a FDDI ring. The Echo protocol is carried out using Echo frames, which may contain any amount up to maximum frame size supported by the FDDI standards, of implementation/specific Echo data.

EXTENDED SERVICE PROTOCOL This protocol is provided for extending new SMT frame-based services. All ES frames use a unique ESF_ID SMT parameter which identifies the extended service being supplied. The protocol and semantics of these frames are specific to the particular ESF_ID carried by the frames.

SYNCHRONOUS BANDWIDTH ALLOCATION This protocol provides for a deterministic mechanism for allocation of Synchronous Bandwidth and supports monitoring for over-allocation of synchronous and total bandwidth. The protocol supports the following functions:

Manage the allocation of the limited Synchronous Bandwidth rsource.

Monitor the amount of Synchronous Bandwidth allocated for use.

Monitor the ring for over-allocation of Synchronous Bandwidth.

The protocol performs the allocation functions through a request-response frame exchange between a station using Synchronous Bandwidth and a Synchronous Bandwidth management process. The frames used are the Resource Allocation frames.

The Station Management provides the specification of management information related to the operation of the Station Management. This information that is supplied to higher-level function (i.e., System Management) is represented using an object oriented approach consistent with the approach taken by Organization Standard International Management Standards. Station Management Information is described in terms of Managed Objects. The Station Management standard defines four Managed Object Classes.

The SMT managed object class models the management information for an FDDI station.

The MAC managed object class models the management information for the MAC entities within a station.

The PATH managed object class models the management information required for the management of configuration paths within a station.

The PORT object class models the management information required for the Physical Protocol/Physical Medium Dependent entities within a station.

FIG. 5 shows an example of a FDDI network allowing communication between server station and client stations via a FDDI ring. Server station which can be for example an IBM RISC/6000 System computer is connected to the ring. Similarly client stations which can be for example IBM Personal System/2 computers connected to the ring. Server station is loaded with its respective application programs such as video server or graphic data server. Server station and client stations being connected to the same FDDI network, are loaded with Station Management program.

Today's FDDI networks do not use FDDI synchronous transmission; however, the interest in FDDI synchronous transmission is gaining momentum as a viable transmission alternative for the emerging multimedia applications. This momentum is fueled by the FDDI Synchronous Implementer's Agreement (IA), developed by the FDDI Synchronous Forum, which provides the basis for Allocation of Synchronous Bandwidth over Fiber Distributed Data Interface. The allocation of Synchronous Bandwidth over a FDDI network is performed by using the Resource Allocation frame protocol. This protocol assumes one central allocator of the Synchronous Bandwidth resource, and provides for the management of SBA, the detection of over allocation, and ability to recover from faults due to over-allocation. FIG. 6 shows an example of an allocation of Synchronous Bandwidth.

A station must receive an allocation of SB before initiating synchronous transmission.

A station that wants to change its current allocation of SB must request the new allocation amount from the SBA Management station.

To request a change in allocation, a station sends a Resource Allocation frame Request (Request Allocation) to a SBA Management station. A SBA Management station will respond with a Resource Allocation frame Response indicating success or failure of the request. If the request fails, the station may adjust its allocation request to within the available bandwidth specified in the response frame and restart the exchange. The Station changes its SB attributes (i.e., in the Management Information Base) when response indicates successful allocation.

The following describes the content of the current FDDI Synchronous Implementer's Agreement. The SBA section of the SMT standard does not define the algorithm(s) used to allocate synchronous bandwidth. An example implementation is defined here including all mandatory SBA functionality. The synchronous allocation request processing is straight/forward, whereas the process of deallocation due to over-utilization or inconsistencies is not. The SBA complexities are in various SBA Actions where deallocations are generated and in the allocation data structures where many SBA parameters are maintained.

The required IA SBA functions are listed below with an example SBA state diagram detailing the IA implementation.

Maintain an SBA Allocation MIB

These data structure(s) maintain all the necessary SBA information used by the SBA state diagram. The SBA state diagram example identifies important elements of these data structures. The SBM internal state diagram uses a (N) notation to identify which end-station substructure is or shall be modified. An example of the information maintained in an SBA data structure for a synchronous end-station is.

Active individual MAC allocation(s), i.e. payload
TimeStamp of latest allocation modification (+/−), used in report actions
SBA Category requirement, used in recovery actions
Max_T_Neg, used in allocate and recovery actions
Min_Segment_Size, used in allocate and recovery actions Variety of flags, signals, counters, and timers.
Recover From
T_Neg change causing over-utilization
T_Neg change causing Segment_Size violations
Reconfigurations causing over-utilization
Other Required SBA Functionality Includes
Payload consistency check via SBA Reporting
MIB consistency check via NIF request (Station_State)
SBA Available Policy defaulting
Control fddiMACT-Neg via local access of fddiMACT-Req

FACILITIES

The following variables, signals, flags, timers, and counters are used within Synchronous Bandwidth Management (SBM) for maintaining input parameters, as well as maintaining the current status of the SBM state diagram.

Variables

A variable shall take on one value from a limited set of possible values. When a variable is cleared, the value of the variable becomes "none". Variables may be exported outside of Synchronous Bandwidth Management.

SB_INPUT A variable from SBA Frame Parser to SBM indicating the type of SBA information be processed. The SBM shall enqueue the SB_Input variable each time it changes value and process them in the order received. The SB_Input is processed from the Active State and has the following values.

NONE—The SB_Input variable is set to None when no frame is received.
REQ_ALLOCATION—The SB_Input variable is set to Req-Allocation when a RAF Request Allocation request is received.
REPORT_RESP—The SB_Input variable is set to Report_Resp when a RAF Report Allocation response is received.
CHANGE_RESP—The SB_Input variable is set to Change_Resp when a RAF Change Allocation response is received.
NIF—The SB_Input variable is set to NIF when a NIF Request or Announcement is received with bit 6 of the station_state set.
T_NEG—The SB_Input variable is set to TNEG when a change in T_Neg has been detected.
UNKNOWN_SYNC_SOURCE—The SB_Input variable is set Unknown_Sync_Source when the NIF protocol identifies an end-station currently allocated synchronous bandwidth that has not been allocated by this SBA application.

Signals

A signal is used to initiate a state change within Synchronous Bandwidth Management. A signal causes the state change to occur and does not have to be cleared following its usage. A signal is local to Synchronous Bandwidth Management and may not be exported. The signals used to drive the SBM state diagram are generated by the supporting FDDI subsystem.

SB_START—A signal internal to SBM used by the SBA application to begin monitoring (control synchronous services) for an FDDI segment.

SB_STOP—A signal internal to SBM used to terminate the SBA application.

CHANGE_REQUIRED—A signal internal to SBM indicating that an RAF Change Allocation request frame shall be sent to an end-station due to a ring event requiring de-allocation(s) to one or more end-staions or due to an fddiPATHSbaPayload discrepancy discovery during the consistency check.

Flags

A flag is a variable that shall take on one of two values: set or cleared. Flags are assigned values within the SBM state diagram by specifying a set or clear operation. Flags are tested within the SBM state diagram by checking their status or the negation of their status. Transitions initiated by flags need only be checked upon initial entry into the state and upon change to the flag. The value of a flag may be exported outside of SBM.

Operational Flags

DEALLOCATION_FLAG—A flag internal to SBM used to direct the SBM back to the Recovery state after sending an SBA RAF Change Allocation request frame.

CHANGE_REQ_FLAG—A flag internal to SBM used to indicate which end-station shall be issued a RAF Change Allocation request frame. This flag is set within Recovery Actions and cleared within Change Actions.

CHANGE_RESP_FLAG—A flag internal to SBM used to direct the SBM back to the Active state after processing an SBA RAF Change Allocation request frame.

REPORT_REQ_FLAG—A flag internal to SBM used to direct the SBM back to the Active state after sending an SBA RAF Report Allocation request frame.

REPORT_RESP_FLAG—A flag internal to SBM used to direct the SBM back to the Active state after processing an SBA RAF Report Allocation response frame.

INCONSISTENCY_FLAG—A flag internal to SBM used to direct the SBM back to the Report state after sending an SBA RAF Change Allocation request frame.

RECOVERY_FLAG—A flag internal to SBM used to direct the SBM back to the Active state after the recovery process has completed.

Timers

Timer Functions

TSR—Timer SBA Report—TSR is initialized at station initialization. SBM maintains a TSR timer for each end-station with active allocation(s). The TSR timer is enabled whenever an allocation is made or modified. Expiration of TRS is sensed by transition SB(13a) resulting in a Report Allocation request issued to the appropriate end-station.
Timer Expiration Values
T_REPORT—2 minutes Counters Counter Functions REPORT_CNT—Report_Cnt is initialized at station initialization. This counter controls the number of SBA RAF Report Allocation request frames the SBM issues before de-allocating all the end-station's active allocations. The Report_Cnt is controlled within Report_Actions. The Report_Cnt is incremented each time an RAF Request Report Allocation is transmitted, this counter is reset when the RAF Response Report Allocation is received.

CHANGE_CNT—Change_Cnt is initialized at station initialization. This counter controls the number of SBA RAF Change Allocation request frames the SBM issues before de-allocating all the end-station's active allocations. The Change_Cnt is controlled within Change_Actions. The Change_Cnt is incremented each time an RAF Request Change Allocation is transmitted, this counter is reset when the RAF Response Change Allocation is received.
Counter Expiration Values
N_CHANGE—The number of Change Allocation request retries.
N_Change default=3
N_REPORT—The number of Report Allocation request retries.
T_Report default=3

Synchronous Bandwidth Management (SBM)

SBM Functional Description

The purpose of this function is to control synchronous allocations on a single FDDI segment. Allocations are limited to the primary FDDI ring. The SBM provides recovery mechanisms to recover unused bandwidth, resolves T_Neg and reconfiguration changes. Many of the SBM state diagram inputs are provided by the underlying FDDI sub-system supporting it.

Detailed SBM Description

STATE SB0: STANDBY

The SBA process begins with transition SB(00) where SBM enters the Standby State. In this state, the SBM waits for the assertion of SB_Start, this occurs after SBA initializes the SBA application.

SB(01): STARTSBAMANAGER—A transition to the Active State is made when SB_Start is asserted.

STATE SB1: ACTIVE

The SBA monitors the FDDI segment from the Active State. Normally SBA is in this state unless an active allocation is being refreshed or SBA is recovering from an over-allocation condition.

B(10): STOPSBAMANAGER—A transition to the Standby State is made when SB_Stop is asserted. The Init_Actions are performed upon this transition.

SB(11A): ALLOCATIONREQUEST—A transition back to the Active state is made when the variable SB_Input is set to Req_Allocation. The Allocation_Actions are performed upon this transition.

SB(11B): NIFMONITORING—A transition back to the Active state is made when the variable SB_Input is set to NIF. The NIF_Monitor_Actions are performed upon this transition.

SB(12): POTENTIALRECOVERYREQUIRED—A transition to the Recovery State is made when SBM receives an indication from the supporting FDDI sub-system that T_Neg has changed. The Recovery_Actions are performed upon this transition.

SB(13A): REPORTALLOCATION—A transition to the Report State is made when an SBM TSR timer expires indicating an end-station's allocation must be refreshed via the SBA RAF Report allocation protocol or when SB_Input=Unknown_Sync_Source. The Report_Actions are performed upon this transition.

SB(13B): PROCESSREPORTRESPONSE—A transition to the Report State is made when the variable SB_Input is set to Report_Resp. The Report_Actions are performed upon this transition.

SB(14): PROCESSCHANGERESPONSE—A transition to the Change State is made when SB_Input=Change_Resp. The Change_Actions are performed upon this transition.

STATE SB21: RECOVERY

The Recovery state indicates SBM has detected a T_neg change potentially requiring a de-allocation of synchronous bandwidth. Entering this state causes SBM to re-evaluate all active allocations contained within the SBA MIB.

SB(21): RECOVERYCOMPLETED—A transition to the Active State is made when the Recovery_Flag has been cleared indicating SBM has resolved the recovery process.

SB(24): RECOVERYDEALLOCATION—A transition to the Change State is made when SBM has determined an active allocation must be de-allocated. The Recovery_Actions shall assert the Change_Required signal. The process of determining which end-station to de-allocate is based on the SBA Category Class field and allocation_time, see Recovery_Actions.

STATE SB3: REPORT

The Report state is used to refresh active allocations and to perform active allocation consistency checks. The consistency checking is necessary to recover unused synchronous allocations when the end-station has been removed from the ring prior to deallocating its bandwidth.

SB(31): REPORTCOMPLETE—A transition to the Active State is made when SBM clears both Report_Req_Flag and Report_Resp_Flag indicating the SBA RAF Report Allocation has been issued or the SBA RAF Report Allocation response has been processed.

SB(34): INCONSISTENCE—A transition to the Change State is made when SBM has determined an active allocation failed the consistency check. The Report_Actions shall assert the Change_Required signal. The Change_Actions are performed upon this transition.

STATE SB4: CHANGE

The Change state is used by SBM to issue an SBA RAF Change allocation frame. Entry into this state occurs when Report Actions detect an allocation inconsistency or the Recovery Actions require a de-allocation to recover from a ring over-allocation condition or when an SBA RAF Change Allocation response has been received.

SB(41): COMPLETEDDEALLOCATION—A transition to the Active State is made when SBM has completed the deallocation process via the Change Allocation protocol. This transition is triggered by clearing the Change_Resp_Flag.

SB(42): POTENTIALADDITIONALRECOVERYREQUIRED—A transition to the Recovery State is made when SBM has is,sued an SBA RAF Change allocation frame, and both the Deallocation and Recovery flags are still SET. The Recovery_Actions shall re-evaluate the SBA MIB to determine if additional de-allocations are required.

SB(43): CONTINUEREPORTPROCESS—A transition to the Report State is made when SBM has issued an SBA RAF Change allocation frame, the Inconsistency_Flag is still SET, and the Recovery_Flag is CLEAR. The Report_Actions shall be performed upon this transition.

SBA LOCAL SERVICE INTERFACE

FIG. 1 is a high level block diagram showing the Local Service Interface between the SBA application and the FDDI subsystem; these services are the minimum required for an IA compliant SBA application and the FDDI subsystem supporting the SBA application.

FIG. 2 is an SBA state diagram as an example of implementation of the core SBA functions. The IA state diagram shows how the various SBA functions could be inter-related. All the necessary conformance tests outlined in the final section, "Interoperability Test Suite", define the detailed requirements for the SBA, this state diagram is only an example.

The following is a detailed description in high level programming language of the actions taken within the SBA state diagram. Comments are inserted between /* and */. This description can be easily used by the man skilled in the art of programming. The actions include (for example) access to the local FDDI subsystem's MIB to control T_Neg and set the fddiPATHSbaAvailable as well as inputs to the SBA RAF Frame Builder to generate a variety of SBA RAF frames.

```
1. INIT_ACTIONS:
        /*Define the maximum number of Synchronous Nodes*/
        MAX_SYNC_NODES = 50 (user defined)
        /*Define the maximum number of Session per Node*/
        MAX_SESSION = 50 (user defined)
        /*Initialize SBA Controlled MIB Attributes*/
        fddiM.ACLongGrpAddress = SMT-SBA-DA
        fddiPATHSbaAvailable = 50Mbps (user defined)
        fddiMACT-Req = 20msec (user defined)
        /*Initialize the SBM Variable*/
        SB_Input = NONE
        /*Clear all Signals*/
        change_required = CLEAR
        SB_start = CLEAR
        SB_stop = CLEAR
        /*Clear General Purpose Flags*/
        inconsistency_flag = CLEAR
        deallocation_flag = CLEAR
        recovery_flag = CLEAR
        /*Initialize Report Timer Expiration*/
        T_Report = 2 minutes (user defined)
        /*Reset Report Timer*/
        TSR = RESET
        /*Initialize SBA MIB Variables*/
        /*Session Variables:
        deallocation_status = NONE
        min_segment_size = ZERO
        session_overhead = ZERO
        session_payload = ZERO
        session_status = FALSE
```

```
        SBA_category = ZERO
        session_id = ZERO
        max_t_neg = ZERO
        class = ZERO
        fddi2 = ZERO*/
        /*Node Variables
        change_resp_flag = CLEAR
        report_resp_flag = CLEAR
        change_req_flag = CLEAR
        report_req_flag = CLEAR
        node_overhead = ZERO
        change_amount = ZERO
        node_status = CLEAR
        node_payload = ZERO
        MAC_address = CLEAR
        timestamp = CLEAR
        report_cnt = ZERO
        change_cnt = ZERO*/
2. ALLOCATE_ACTIONS:
        /*SB(11A)*/
        /*PROCESS ALLOCATION REQUEST*/
        total_payload = f(total_payload,
    requested_overhead)
        total_overhead = f(total_overhead,
requested_overhead)
        synchronous_load = (total_overhead +
total_payload)
        /*AVAILABILITY VERIFICATION (BYTES/SEC)*/
        IF(fddiPATHSbaAvailable >= synchronous_load)
            THEN
                BEGIN
                    availability_check = OK
                END
            ELSE
                BEGIN
                    availability_check = NOT_OK
                END
        /*DELAY VERIFICATION (SECONDS)*/
        IF(requested max_t_neg >= Opr_T_Neg)
            THEN
                BEGIN
                    delay_check = OK
                END
            ELSE
                BEGIN
                    /*optionally change T_Neg*/
                    delay_check = NOT_OK
                END
        /*SEGMENTATION VERIFICATION (BYTES/SEC)*/
        IF(min_seg_size <= (T_Neg * payload)
            THEN
                BEGIN
                    SET segmentation_check = OK
                END
            ELSE
                BEGIN
                    CLEAR segmentation_check = NOT_OK
                END
        /*COMBINED VERIFICATION*/
        IF((availibility_check == OK) &&
           (segmentation_check == OK) &&
           (delay_check == OK)          )
            THEN
        /*allow allocation is for an existing or new session
*/
                BEGIN
                    session_overhead += requested overhead
                    session_payload += requested payload
                    node_overhead += requested overhead
                    node_payload += requested payload
                    min_seg_size = requested min_seg_size
                    max_t_neg = requested max_t_neg
                    category = requested category
                    session_status = ACTIVE
                    node_status = ACTIVE
                    /*use lower value*/
                    sba_allocatable = f(Opr_T_neg, max_t_neg)
                    IF(new session_payload <= ZERO)
            THEN
                BEGIN
```

-continued

```
                initialize session data
            END
    IF(new node_payload <= ZERO)
        THEN
            BEGIN
                initialize node data
            END
        ELSE
            BEGIN
                ENABLE node report timer
            END
    /*send an RAF allocation response*/
    transaction_id = requested transaction_id
    sba_allocatable = new sba_allocatable
    fddiPATHSbaOverhead = node_overhead
    fddiPATHSbaPayload = node_payload
    alloc_addr = requested alloc_addr
    category = requested category
    fddiPATHIndex = PRIMARY_RING
    reason_code = SUCCESS
    SB_input = NONE
            END
    ELSE
        THEN
            /*disallow allocation*/
            BEGIN
                transaction_id = requested transaction_id
                sba_allocatable = previous sba_allocatable
                fddiPATHSbaOverhead = node_overhead
                fddiPATHSbaPayload = node_payload
                alloc_addr = requested alloc_addr
                category = requested category
                fddiPATHIndex = PRIMARY_RING
                reason_code = DENIED
                SB_input = NONE
            END
3. REPORT ACTIONS:
    /*SB(13A)*/
    /*send report request*/
    IF(report_req_flag == SET)
        THEN
            BEGIN
                IF(++report_cnt > 3)
                    THEN
                        initialize all node allocations
                        /*no response three times*/
                    ELSE
                        BEGIN
                            send report request
                            RESET TSR
                        END
                CLEAR report_req_flag
            END
    /*SB(13B)*/
    /*process report response*/
    /*known station*/
    IF((report_resp_flag == SET) &&
       (node_status == ACTIVE))
        THEN
            BEGIN
                IF(reported node payload consistent)
                    THEN
                        CLEAR report_resp_flag
                        RESET report_cnt
                    ELSE
                        /*error condition detected*/
                        BEGIN
                /*CASE 1*/
                            IF((reported payload is high) &&
                               (additional BW is available))
                                THEN
                                    BEGIN
                                new static session data
                                category = STATIC
                                max_t_neg = Opr_T_Neg
                                overhead = FIFTY_BYTES
                                payload = additional BW
                                update node data
                                overhead = reported overhead
                                payload = reported payload
```

```
                                RESET report_cnt
                                CLEAR report_resp_flag
                        END
                /*CASE 2*/
                IF((reported payload is high) &&
                        (additional BW not available))
                        THEN
                                BEGIN
                                SIGNAL change_required
                                change_amount = node_payload
                                RESET report_cnt
                                CLEAR report_resp_flag
                                END
/*CASE 3*/
                        IF((reported payload is low) &&
                                (reduce registered BW))
                        THEN
                                BEGIN
                        node_payload = reported payload
                        node_overhead = reported overhead
                        RESET report_cnt
                        CLEAR report_resp_flag
                                END
                END
        /*unknown station*/
        IF((report_resp_flag == SET) &&
                (node_status == UNKNOWN))
                THEN
                        BEGIN
        /*CASE 1*/
                IF(unknown reported BW is available)
                        THEN
                        /*open a new session*/
                        BEGIN
                                new static session data
                                category = STATIC
                                max_t_neg = Opr_T_Neg
                                overhead = reported overhead
                                payload = reported payload
                                update node data
                                overhead = reported overhead
                                payload = reported payload
                                node_status = ACTIVE
                                RESET report_cnt
                                CLEAR report_resp_flag
                        END
        /*CASE 2*/
                IF(unknown reported BW not available)
                        THEN
                        BEGIN
                                SIGNAL change_required
                                change_amount = reported payload
                                RESET report_cnt
                                CLEAR report_resp_flag
                        END
                END
4 CHANGE_ACTIONS:
        /*SB(14)*/
                /*process change response*/
                IF((change_resp_flag ==SET) &&
                (deallocate_status == PENDING))
                        THEN
                        BEGIN
                                IF(deallocating a "known' session)
                                        THEN
                                        initialize session's allocation
                                        deallocate_status = NONE
                                        CLEAR change_resp_flag
                                        RESET change_cnt
                                        END
                                ELSE IF(deallocating an "unknown" session)
                                        THEN
                                        deallocate partial node data
                                        deallocate_status = NONE
                                                CLEAR change_resp_flag
                                                RESET change_cnt
                                                END
                        END
        /*SB(24)*/
        /*send change request*/
```

```
                              -continued

IF((deallocation_flag == SET        ) &&
           (deallocate_status == TX_CHANGE  ) &&
           (session requires deallocated)   )
            THEN
                BEGIN
                    build RAF change request frame
                    *new payload -= session's payload
                    *new overhead -= session's overhead
                    *category = session's category
                    IF(change_cnt < 3)
                        THEN
                            BEGIN
                                ++ change_cnt
                                send RAF change frame
                                deallocate_status = PENDING
                            END
                        ELSE
                            BEGIN
                                initialize all node
allocations
                                *no response three times
                            END
                END
    /*SB(34)*/
    /*send change request*/
        (IF((inconsistency_flag == SET           ) &&
            (deallocate_status == TX_CHANGE      ) &&
            (node_status == (ACTIVE || UNKNOWN)  )   )
            THEN
                BEGIN
                    build RAF change request frame
                    new payload -= change_amount
                    new overhead -= FIFTY_BYTES
                    category = ZERO
                    IF(change_cnt < 3)
                        THEN
                            BEGIN
                                ++ change_cnt
                                send RAF change frame
                                deallocate_status = PENDING
                            END
                        ELSE
                            BEGIN
                            initialize all node allocations
                                *no response three times
                            END
                END
5. RECOVERY_ACTIONS:
    /*SB(12) OR SB(42)*/
    /*check all session Max_T_Neg values*/
        IF(recovery_flag == SET)
            THEN
                BEGIN
                    If((Max_T_Neg < New_T_Neg)    &&
                       (Session_Status == ACTIVE) )
                        THEN
                    Deallocate End-Station(s) based on new value
                            of T_Neg.
                            deallocate_status = TX_CHANGE
                            change_required = YES
                        END
                END
        IF(change_required == CLEAR)
            THEN
                BEGIN
                    CLEAR recovery_flag
                END
6. NIF_MONITOR_ACTIONS:
    /*SB(11B)*/
    /*synch node yes or no?*/
        IF(Station_State (bit 6) == SET)
            THEN
                BEGIN
                    SB_Input = UNKNOWN_SYNC_SOURCE
                END
```

The SBA application is responsible for allocating synchronous bandwidth to applications requiring guaranteed bandwidth and predictable delay. A single SBA manages an FDDI Segment, each FDDI segment has one and only one SBA actively managing all synchronous traffic. If this. SBA application fails, additional allocations would not be allowed, existing allocations could not increase or decrease their allocations.

SUMMARY OF THE INVENTION

It is therefore an object of the present invention to address the problem of failure of an SBA application, by providing extensions to the FDDI Synchronous Implementer's Agreement. In particular the SBA Internals section of this agreement is modified to allow slave SBA applications to monitor the FDDI segment and take on the role of master SBA when needed.

The concept of a master and slave allocator is used to develop the high availability SBA model. The master SBA is the SBA responsible for granting or denying allocation requests as well as managing disturbances resulting from network changes, such as changes in token rotation delays. The master SBA will communicate with the slave SBA (if present) to update the slave with current allocation information. These updates are communicated from master to slave via the unique extended service frame protocol using an IBM specific encoding. The updates occur when allocations are modified. When the user enables an SBA application (which conforms to the present invention) the underlying SBA state machine shall transition to a new SBA state called BACKUP STATE as opposed to directly going to the Active State. The Active state is now for one and only one SBA application, the master SBA.

The purpose of this new state is to learn if a master and/or slave are currently operational. The newly inserting SBA application learns if other SBA applications are present by transmitting an SBA_Hello request. The SBA_Hello responses is transmitted only by the master SBA application, if present. This response will inform the newly inserting SBA application if a slave and/or master are already present. If the newly inserting SBA application sees both master SBA and slave SBA are present, it asserts the SB_Stop signal used to terminate synchronous monitoring. On the other hand if only a master is present this newly inserting SBA application assumes the role of slave where it shall periodically receive updates from the master SBA application. These updates occur whenever the master SBA modifies its SBA management information base (MIB). A periodic master present request is used to inform the slave that the master is still present and capable of managing the synchronous traffic. The periodicity of these requests are one per minute.

More particularly, the invention includes a system of high availablity synchronous bandwidth allocation comprising an FDDI segment to which are connected a first device having means for allocating synchronous bandwidth over said FDDI segment to any requesting device, and at least a second device having means for requesting synchronous bandwidth over said FDDI segment, and further comprising means in said first device, and in a third device also connected to said FDDI segment, for establishing a communication and exchanging between said first and third devices information regarding the allocation of synchronous bandwidth to said at least second device, and means in said third device to take over the first device as synchronous bandwidth allocator, when said first device is in failure.

One advantage of the present invention is to allow a redundant SBA application (the slave SBA) to keep a SHADOW COPY of the master's SBA MIB. When the master fails, the FDDI segment is without an SBA manager for three minutes if a slave SBA is present. Detection of the master failure occurs when the slave fails to receive three consecutive master present announcements. When the slave detects a master failure it transitions to the Active State where it assumes the role of master. If the slave does not have all of the master's SBA MIB, the slave shall learn about the unknown data using the SBA report request protocol.

This new master SBA shall dialog with another SBA slave when enabled by the user; these events are noticeable big an FDDI manager monitoring status reporting frames.

Note that the ANSI X3T9.5 SMT standardized an Extended Service (ES) protocol for extending and exercising new SMT frame-based services. The present invention uses the ES protocol to pass IBM specific SBA application information.

BRIEF DESCRIPTION OF THE DRAWINGS

FIG. 4 shows the format of a FDDI frame and a FDDI token.

DESCRIPTION OF THE PREFERRED EMBODIMENT OF THE INVENTION

Figure 1:
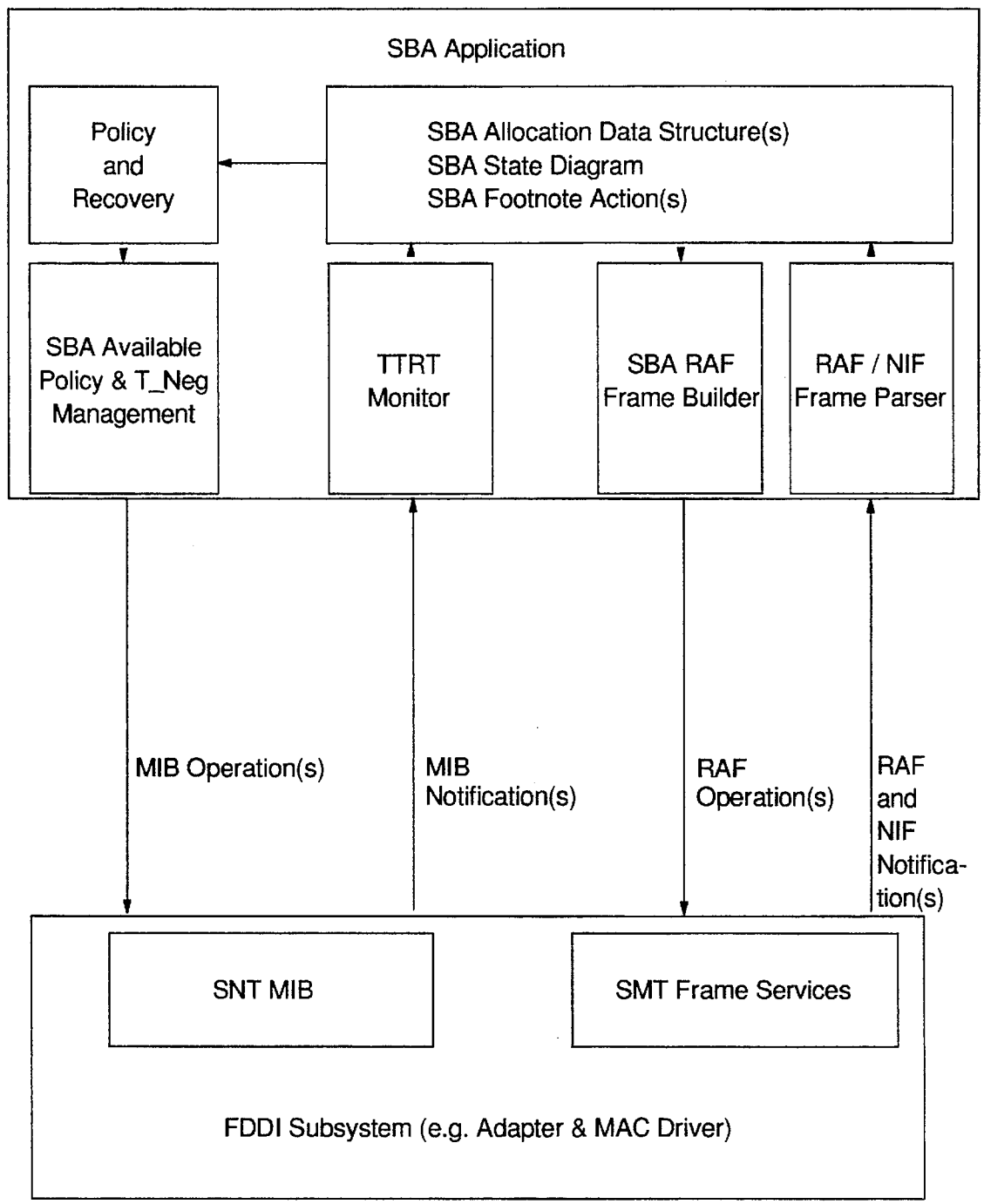
FIG. 1 shows the FDDI Synchronous Forum Implementer's Agreement high level block diagram.
Figure 2:
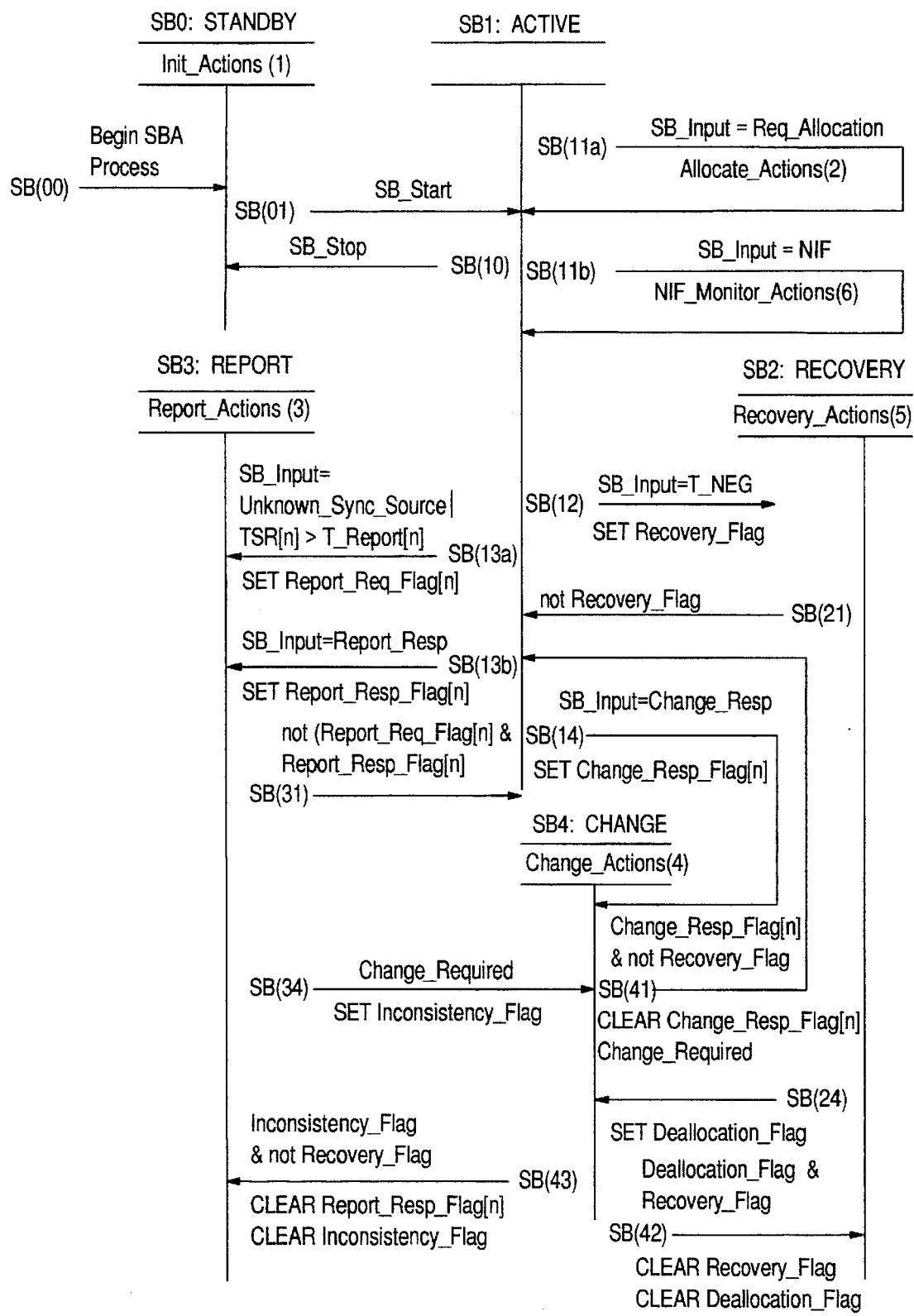
FIG. 2 shows the FDDI Synchronous Forum Implementer's Agreement SBA state diagram.
Figure 3:
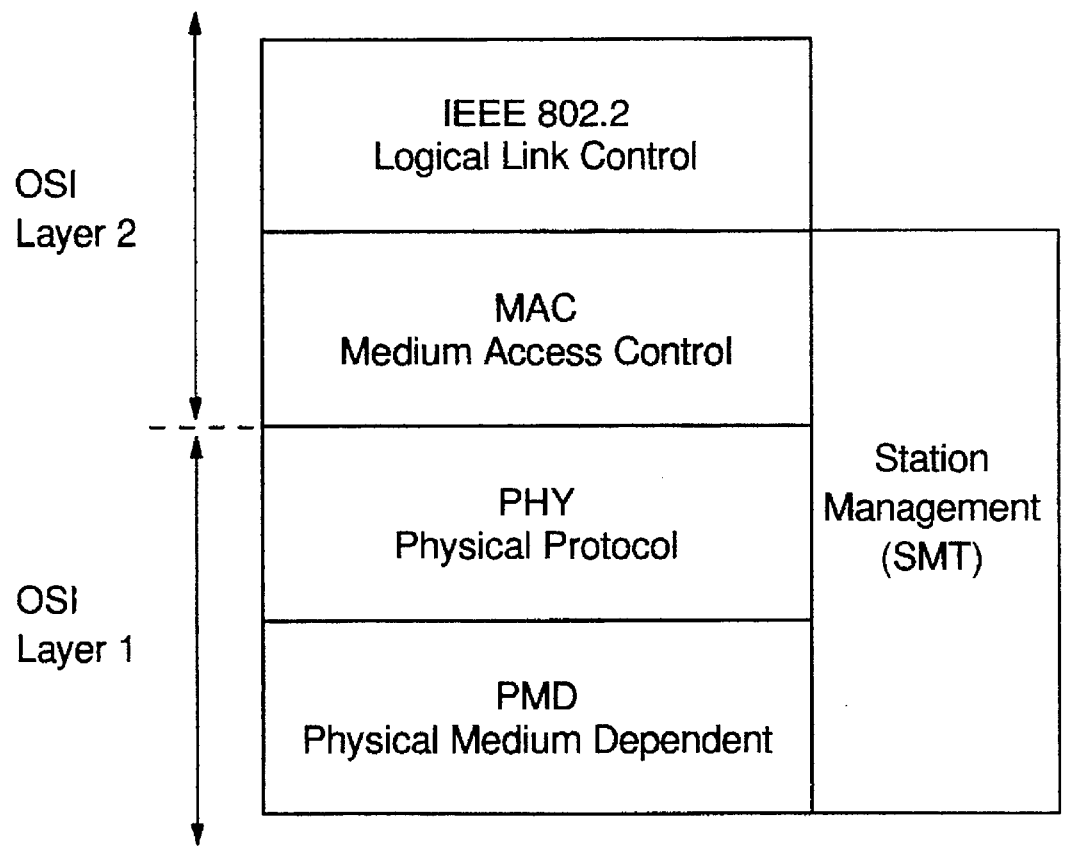
FIG. 3 shows the lower layers of the IEEE communication layer model, base for the American National Standards Institute Station Management standard used for FDDI.
Figure 5:
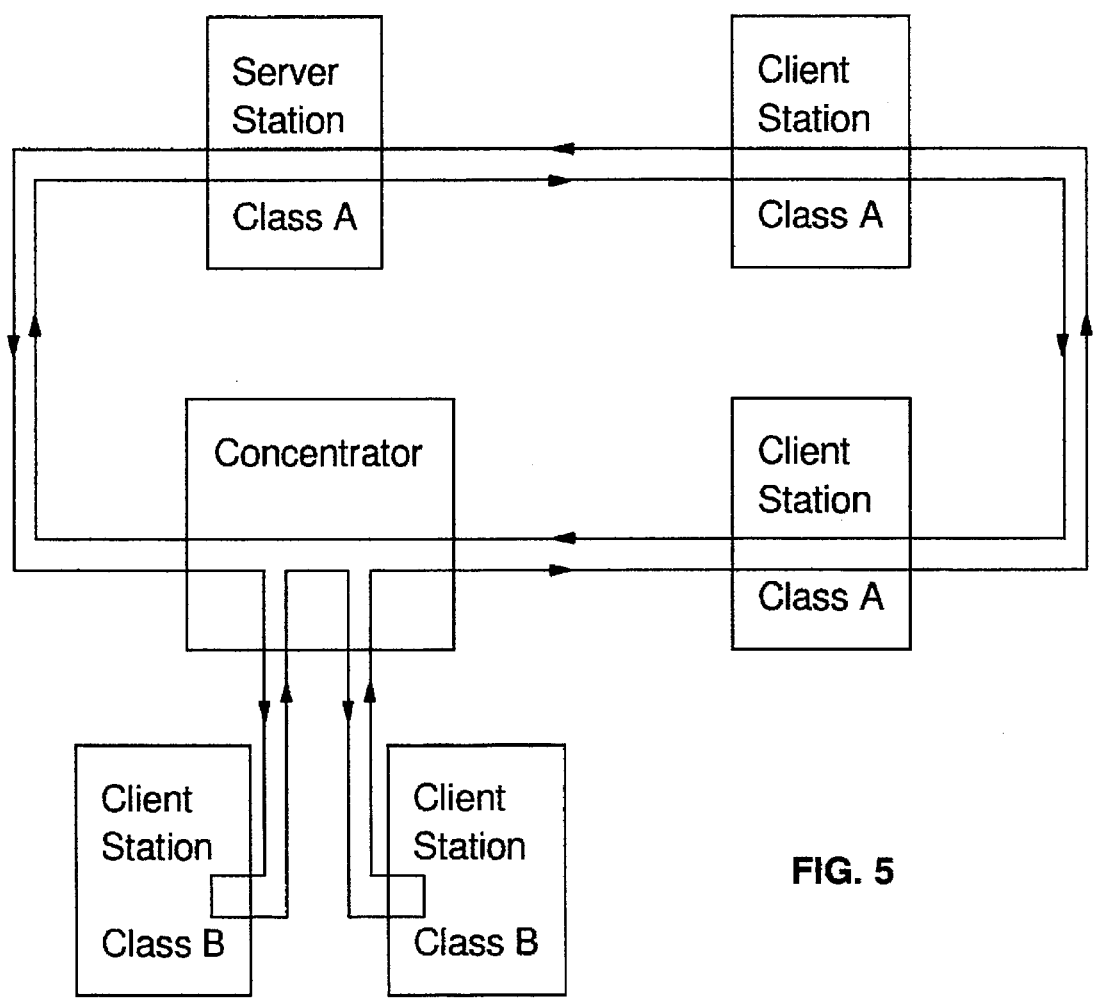
FIG. 5 illustrates an example of FDDI traffic between a client and a server.
Figure 6:
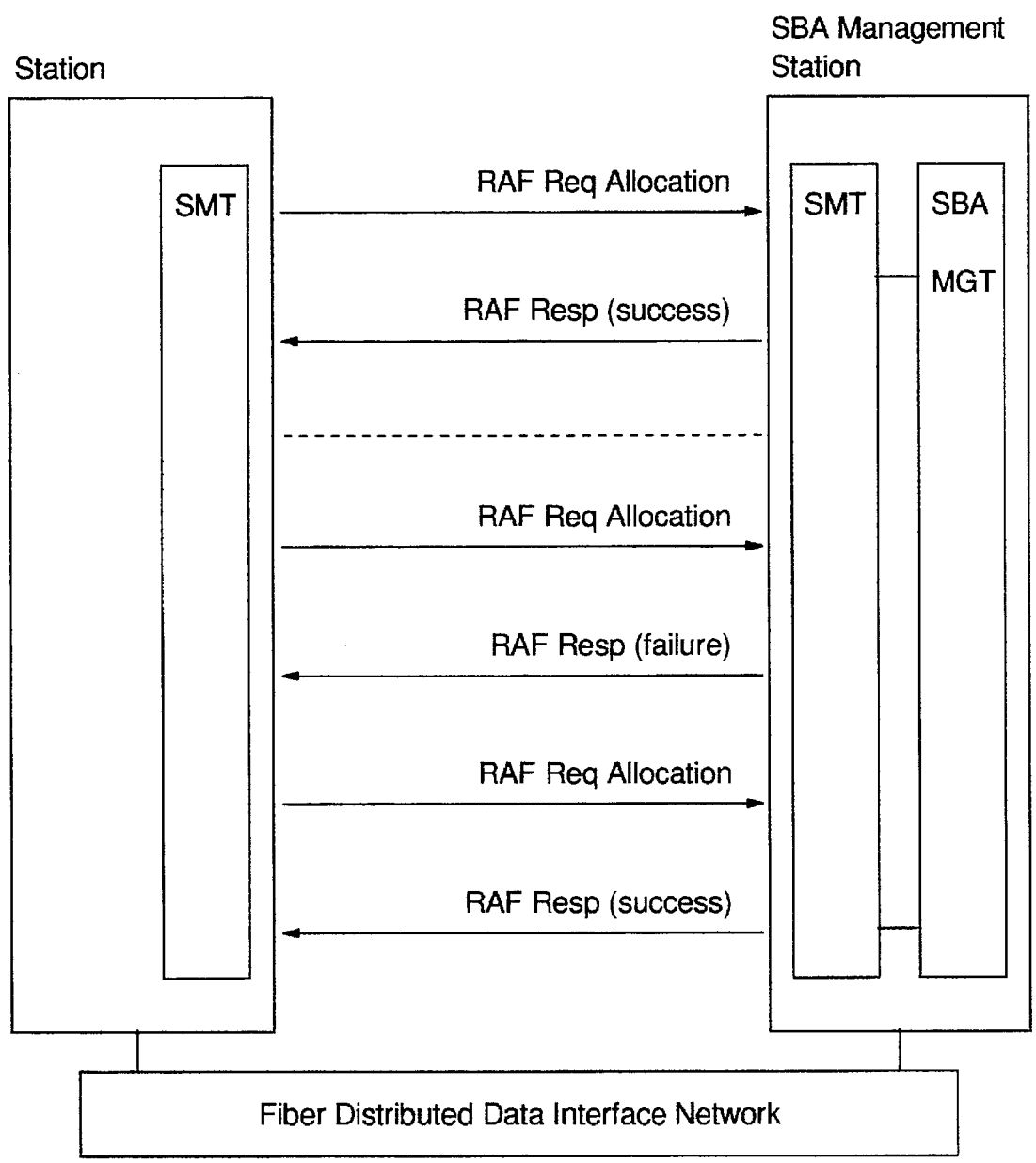
FIG. 6 shows the allocation of bandwidth over a FDDI network.
Figure 7:
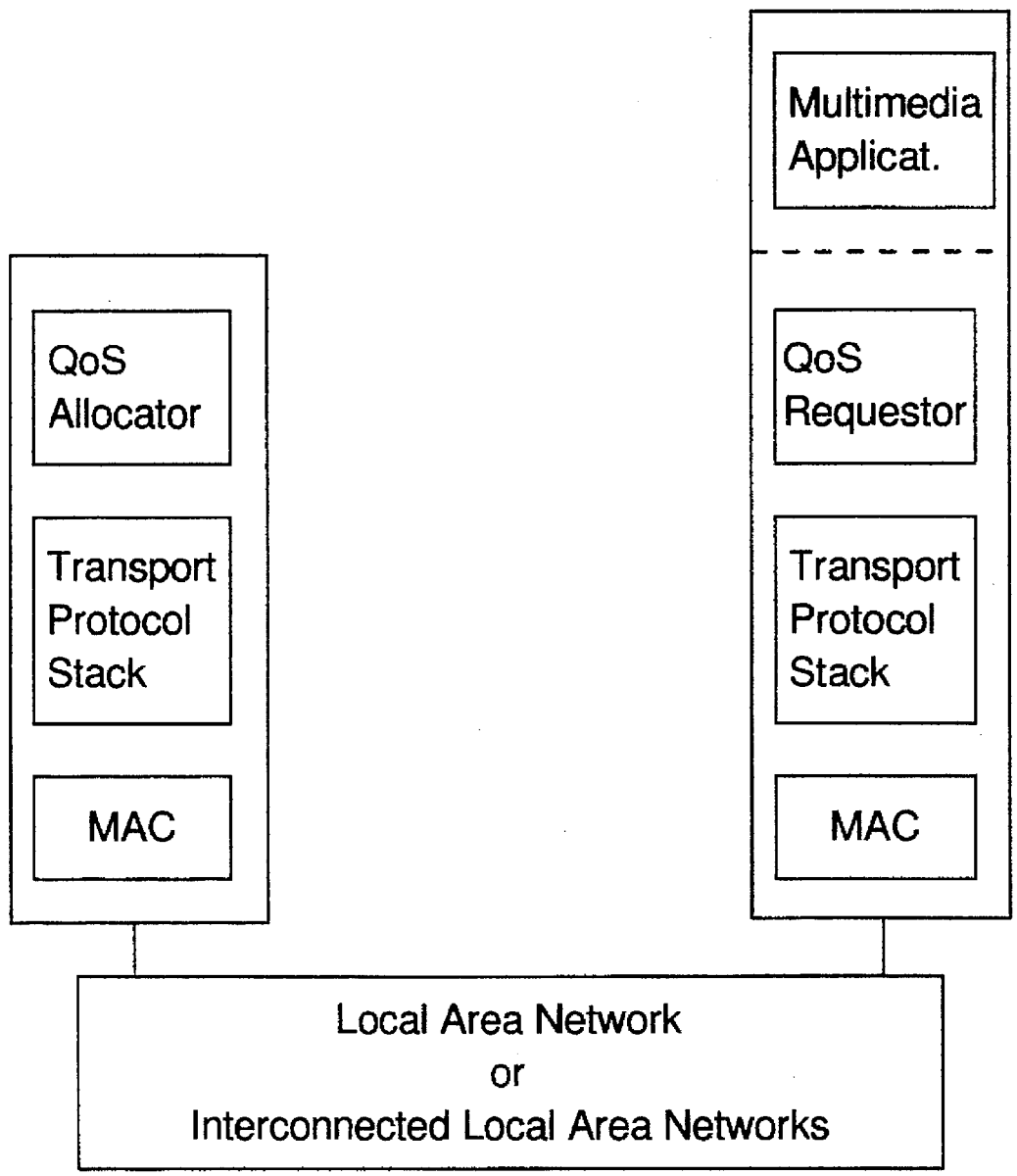
FIG. 7 illustrates the structure of QoS Allocator and QoS Requestor to allocate bandwidth over Local Area Networks.
Figure 8:
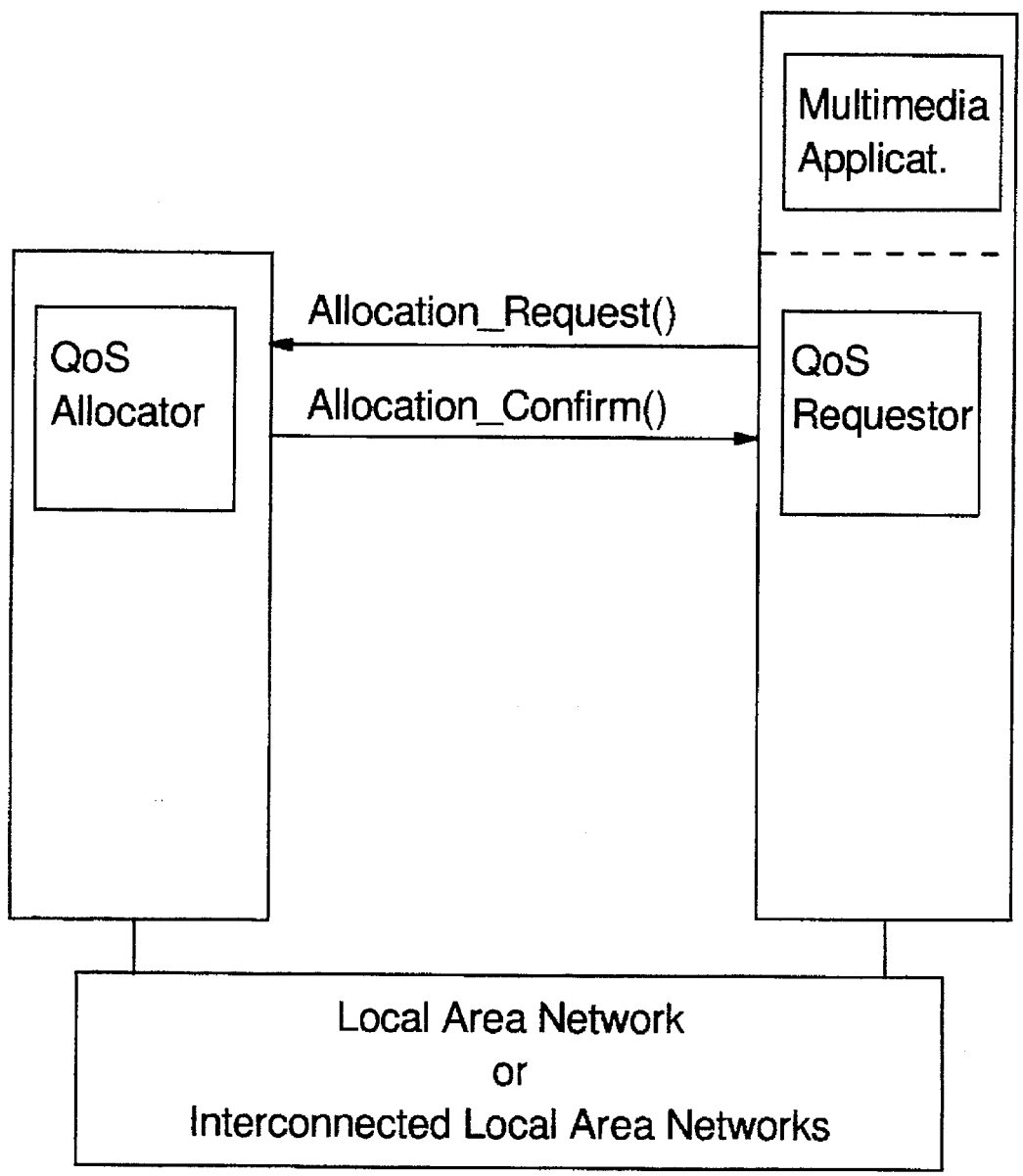
FIG. 8 illustrates an example of protocol used between QoS Allocator and QoS Requestor to allocate bandwidth over LANs.
Figure 9:
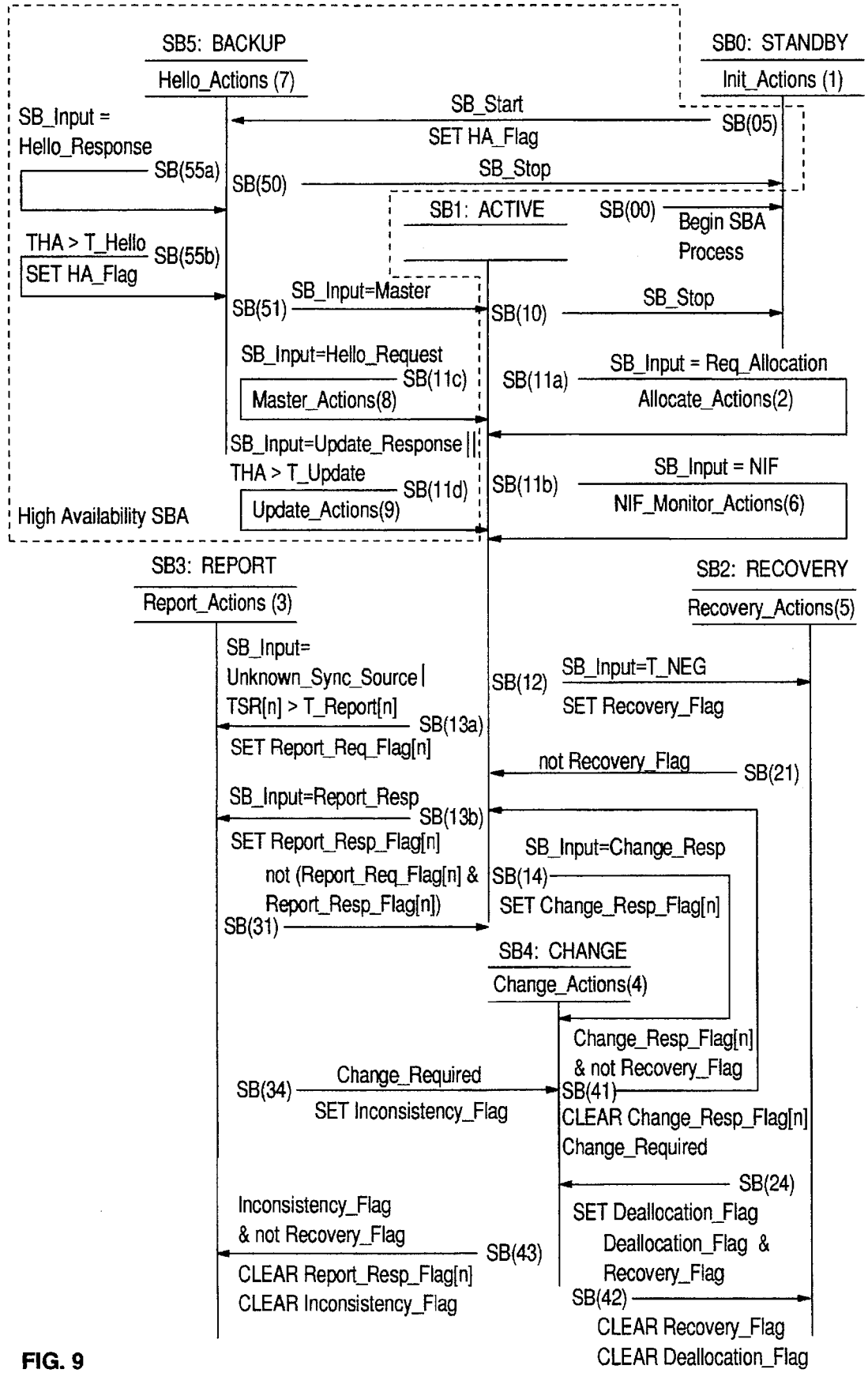
FIG. 9 shows the invention high availability SBA state machine.
Figure 10:
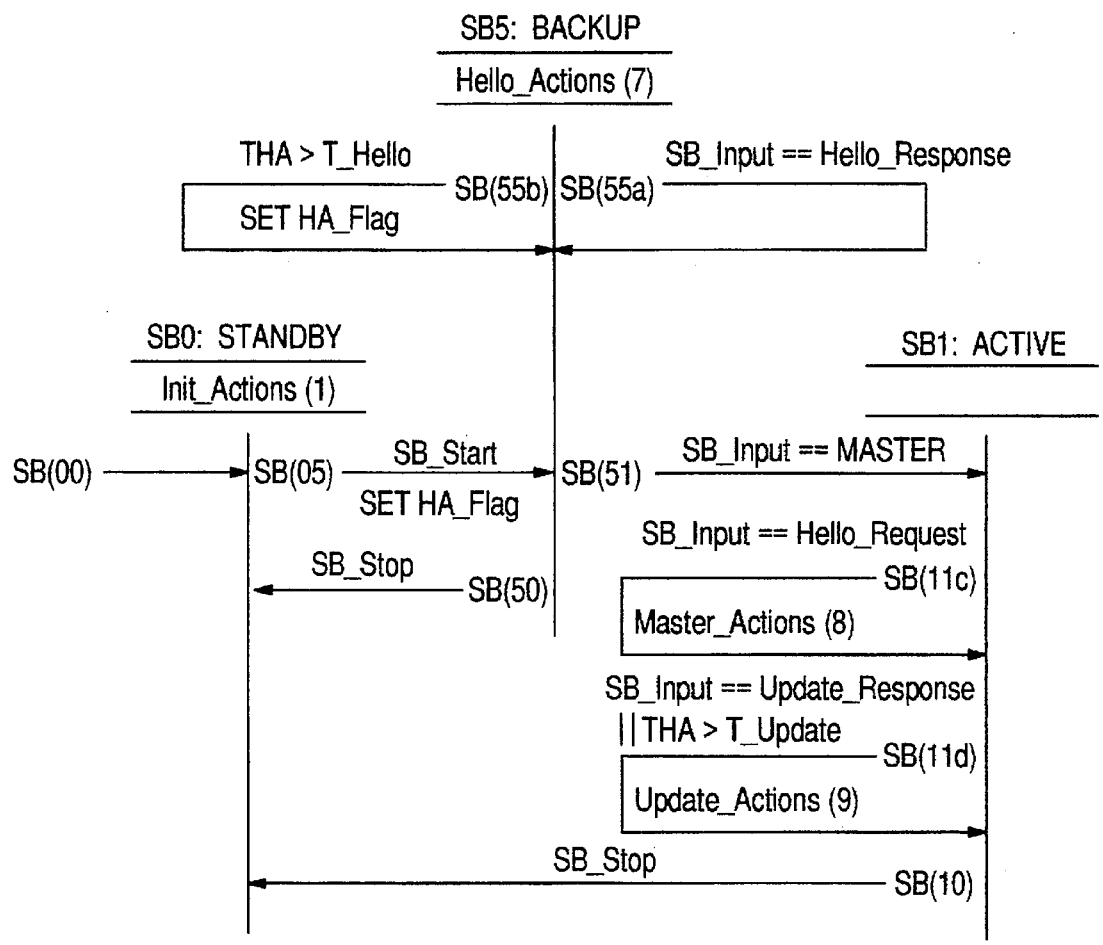
FIG. 10 shows invention modifications to the SBA state machine.

The following describes the process used by the modified SBA state machine to establish a slave and master SBA application. This section represents the embodiment of the present invention. The modifications to the SBA state machine are described in FIG. 10 and the high availability SBA state machine is described in FIG. 9. Notice that the invention modifications are easily identified, they are dotted and boxed in. The process is straightforward and unique. When a high availability SBA (HA-SBA) asserts the SB_Start signal, the HA-SBA transitions from the standby state to the backup state. The hello_actions are performed upon this transition.

The hello_actions queue an SBA hello request message, using the SMT Extended Service Frame (ESF). An IBM specific ESF_ID is used to encode the SBA hello messages. The SBA hello request message is received by the master HA-SBA application if it is operational. This SBA hello message encoding is described as follows:

SBA HELLO REQUEST MESSAGE

| | |
|---|---|
| FC: X'41' | (SMT Info) |
| DA: X'80014300800C' | (SMT-SBA-DA) |
| SA: X'xxxxxxxxxxxx' | (Individual) |
| ame_Class: X'FF' | (ESF) |
| Frame_Type: X'02' | (Request) |
| Version_ID: X'0002' | (SMT 7.2e standard) |
| Transaction_ID: X+xx ... xx' (6 octets) | (Source Station Defined) |
| Station_ID: X'000008005Axxxxxx' | (xx's IBM Defined) |
| Pad: X'0000' | |
| InfoField_Length: X'001C' | (28 bytes) |

SBA HELLO REQUEST MESSAGE

| | |
|---|---|
| ESF_TL: X'FFFF 0008' | (ESF_ID Type/Length) |
| Pad: X'0000' | |
| ESF_X'0800 5A2F FFFF' | (IBM defined) |
| ibmHHA_Variable_TL: X'32FF 000C' | (IBM defined) |
| ResourceIndex: X'0000 0001' | |
| ibmPATHHA_Variable: | (IBM Defined-Hello Req) |
| X'0800 5A01 0000 0001' | |

Each time a hello request message is transmitted the hello counter is incremented. If three hello requests are transmitted without a corresponding hello response, the newly inserting HA-SBA assumes the role of master by setting SB_input to master.

If a master HA-SBA application receives this SBA hello message it queues a hello response, the hello response message is described as follows along with the encoding:

SBA HELLO RESPONSE MESSAGE

| | |
|---|---|
| FC: X'41' | (SMT Info) |
| DA: X'xx ... xx' (6 octets) | (Individual from req SA) |
| SA: X'xxxxxxxxxxxx' | (Individual) |
| rame_Class: X'FF' | (ESF) |
| Frame_Type: X'03' | (Response) |
| Version_ID: X'0002' | (SMT 7.2e standard) |
| Transaction_ID: X'zzzzzzzz' | (Transaction_ID from req) |
| Station_ID: X'000008005Axxxxxx' | (xx's IBM Defined) |
| Pad: X'0000' | |
| eld_Length: X'0044' | (68 bytes) |
| ESF_TL: X'FFFF 0008' | (ESF_ID Type/Length) |
| Pad: X'0000' | |
| ESF_ID: X'0800 5A2F FFFF' | (IBM defined) |
| ibmPATHHA_Variable_TL: X'32FF 000C' | |
| ResourceIndex: X'0000 0001' | |
| ibmPATHHA_Variable: | (IBM Defined- Hello Resp) |
| X'0800 5A01 0000 0002' | |
| ibmPATHHA_Master_Addr_TL: X'32FF 0010 | |
| ResourceIndex: X'0000 0001' | |
| ibmPATHHA_Master_Addr: X'0800 5A02 0000 0800 5Axx xxxx' (Individual) | |
| ibmPATHHA_Slave_Addr_TL: X'32FF 0010 | |
| ResourceIndex: X'0000 0001' | |
| ibmPATHHA_Slave_Addr: X'0800 5A03 0000 0800 5Axx xxxx' (Individual) | |

The newly inserting HA-SBA receives a hello response from the HA-SBA master. This response contains the HA-SBA master and slave addresses. If a slave is identified as being present, this newly inserting HA-SBA application asserts the SB_Stop message and transitions to the standby state where it remains until the user enables it again. If there previously was not a HA-SBA slave present, the master's hello response shall identify this newly inserting HA-SBA as the slave.

Each synchronous bandwidth allocation shall support and update the following Vendor specific data:

| | | |
|---|---|---|
| Attributes: | | |
| fddiPATHVendorAttrib | GR 0 32 FF | |
| ibmPATHHA_Variable | G | 01 |
| ibmPATHHA_Master_Address | G | 02 |
| ibmPATHHA_Slave_Address | G | 03 |
| Actions: | | |
| fddiPATHVendorAction | GR 0 32 FE | |
| ibmPATHHA_Start | S | 01 |
| ibmPATHHA_Stop | S | 02 |
| Notifications: | | |
| fddiPATHVendorAction | GR 0 32 FC | |
| ibmPATHMasterPresent | NA | 01 |
| ibmPATHSlavePresent | NA | 02 |

When a HA-SBA reaches the Active state, by definition it is called the HA-SBA master, and is now responsible for managing all synchronous traffic. This HA-SBA master is also responsible for interacting with a HA-SBA slave when the user has one enabled.

The HA-SBA master transmits update messages to the HA-SBA slave application. This is a request/response paradigm because it serves two purposes, first the slave uses the update request to learn if the master SBA is still active, and secondly the master uses the response to learn if the slave is still standing by and capable of assuming the HA-SBA master's role. The update request message and the update response message are described as follows, both diagrams show the specific encoding used:

HA UPDATE REQUEST MESSAGE

| | |
|---|---|
| FC: X'41' | (SMT Info) |
| DA: X'xx ... xx' (6 octets) | (Individual Slave Addr) |
| SA: X'xxxxxxxxxxxx' | (Individual) |
| Frame_Class: X'FF' | (ESF) |
| Frame_Type: X'02' | (Request) |
| Version_ID: X'0002' | (SMT 7.2e standard) |
| Transaction_ID: X'zzzzzzzz' | (Transaction_ID from req) |
| Station_ID: X'000008005Axxxxxx' | (xx's IBM Defined) |
| Pad: X'0000' | |
| nfoField_Length: X'0044' | (68 bytes) |
| ESF_TL: X'FFFF 0008' | (ESF_ID Type/Length) |
| Pad: X'0000' | |
| ESF_ID: X'0800 5A2F FFFF' | (IBM defined) |
| bmPATHHA_Variable_TL: X'32FF 000C' | |
| ResourceIndex: X'0000 0001' | |
| ibmPATHHA_Variable: | (IBM Defined- HA Update) |
| X'0800 5A01 0000 0003' | |
| ibmPATHHA_Master_Addr_TL: X'32FF 0010 | |
| ResourceIndex: X'0000 0001' | |
| ibmPATHHA_Master_Addr: X'0800 5A02 0000 0800 5Axx xxxx' (Individual) | |

-continued

```
ibmPATHHA_Slav_Addr_TL: X'32FF 0010
    ResourceIndex: X'0000 0001'
ibmPATHHA_Slave_Addr: X'0800 5A03 0000 0800 5Axx xxxx' (
Individual)
HA UPDATE RESPONSE MESSAGE
    FC: X'41'                                   (SMT Info)
    DA: X'xx ... xx' (6 octets)                 (Individual from req SA)
    SA: X'xxxxxxxxxxxx'                         (Individual)
    Frame_Class: X'FF'                          (ESF)
    Frame_Type: X'03'                           (Response)
    Version_ID: X'0002'                         (SMT 7.2e standard)
    Transaction_ID: X'zzzzzzzz'                 (Transaction_ID from
req)
    Station_ID: X'000008005Axxxxxx'             (xx's IBM
Defined)
        Pad: X'0000'
    InfoField_Length: X'0044'                   (68 bytes)
        ESF_TL: X'FFFF 0008'                    (ESF_ID Type
/Length)
        Pad: X'0000'
        ESF_ID: X'0800 5A2F FFFF'               (IBM defined
)
    ibmPATHHA_Variable TL: X'32FF 000C'
        ResourceIndex: X'0000 0001'
    ibmPATHHA_Variable: X'0800 5A01 0000 0004'  (IBM Defined-
HA Update)
ibmPATHHA_Master_Add_TL: X'32FF 0010
        ResourceIndex: X'0000 0001'
    ibmPATHHA_Master_Addr: X'0800 5A02 0000 0800 5Axx xxxx' (
Individual)
    ibmPATHHA_Slave_Addr_TL: X'32FF 0010
        ResourceIndex: X'0000 0001'
    bmPATHHA_Slave_Addr: X'0800 5A03 0000 0800 5Axx xxxx' (
The update_actions are performed each time an update
response is received or when the THA timer expires while the
SBM is in the Active state.
```

Modifications to SBA Internals Facilities Section

The following variables, signals, flags, timers, and counters are used within High Availability Synchronous Bandwidth Management (SBM) for maintaining input parameters, as well as maintaining the current status of the HA-SBM state diagram. The following descriptions are additions (modifications) to the current SBM state machine and are consistent with the IBM High Availability Synchronous Bandwidth Allocator Invention. These HA-SBA modifications (sections 5.1–5.2.2.3) plus the current version of the SBA Internals (sections 2.4–2.5.2.5) described in the unique IBM High Availability SBA application.

Variables

A variable shall take on one value from a limited set of possible values. When a variable is cleared, the value of the variable becomes "none". Variables may be exported outside of Synchronous Bandwidth Management.

SB_INPUT A variable from SBA Frame Parser to SBM indicating the type of SBA information to be processed. The SBM shall queue the SB_Input variable each time it changes value and process them in the order received. The SB_Input is processed from the Active State and has the following values.

MASTER—The SB_Input variable is set to master when the SBM determines it is the HA-SBA master. This occurs when no other HA-SBA is enabled on the FDDI segment.

HELLO_RESPONSE—The SB_Input variable is set to hello_response when an SBA hello response message is received in the backup state, state five.

HELLO_REQUEST—The SB_Input variable is set to hello_request when an HA-SBA master in Active state, receives a SBA hello request message.

Signals

A signal is used to initiate a state change within Synchronous Bandwidth Management. A signal causes the state change to occur and does not have to be cleared following its usage. A signal is local to Synchronous Bandwidth Management and may not be exported. The signals used to drive the SBM state diagram are generated by the supporting FDDI subsystem.

SB_START—A signal internal to SBM used by the HA-SBA application to transition to the BACKUP State.

Flags

A flag is a variable that shall take on one of two values: set or cleared. Flags are assigned values within the SBM state diagram by specifying a set or clear operation. Flags are tested within the SBM state diagram by checking their status or the negation of their status. Transitions initiated by flags need only be checked upon initial entry into the state and upon change to the flag. The value of a flag may be exported outside of SBM.

Operational Flags

HA_FLAG—A flag internal to SBM used to direct the Hello_Actions to transmit an SBA Hello request message.

Timers

Timer Functions

THA—Timer SBA High Availability—THA is initialized at station initialization. SBM maintains a THA timer for two purposes, to trigger hello request messages, and to trigger periodic updates messages.

Timer Expiration Values

T_HELLO—1 minute is the preferred embodiment as optimizing generated messages trafic vs available bandwidth over FDDI. Other values between 30 seconds and 2 minutes could also be considered.

T_UPDATE—10 minutes is the preferred embodiment as optimizing generated messages trafic vs available bandwidth over FDDI, and also the duration the ongoing synchronous applications with a failing synchronous bandwidth allocator. Other values between 3 minutes and 12 minutes could also be considered.

COUNTERS

Counter Functions

HELLO_CNT—Hello_cnt is initialized at station initialization. This counter controls the number of HA-SBA hello requests that are transmitted.

UPDATE_CNT—Update_cnt is initialized at station initialization. This counter controls the number of HA-SBA update requests that are transmitted.

Counter Expiration Values
  N_HELLO—The number of Hello request retries.
  N_Hello default=3
  N_UPDATE—The number of Update request retries.
  N_Update default=3

SYNCHRONOUS BANDWIDTH MANAGEMENT (SBM)

SBM Functional Description

Detailed SBM Description
STATE SB0: STANDBY

The HA-SBA process begins with transition SB(00) where HA-SBM enters the Standby State. In this state, the HA-SBM waits for the assertion of SB_Start, this is under the control of the user. SB_Start can be asserted either locally or remotely.

SB(05): STARTHASBAMANAGER—A transition to the BACKUP State is made when SB_Start is asserted. The Hello_Actions are performed on this transition.

STATE SB1: ACTIVE

The SBA monitors the FDDI segment from the Active State. Normally SBA is in this state unless an active allocation is being refreshed or SBA is recovering from an over-allocation condition.

SB(11C): HASLAVEPRESENT—A transition back to the Active state is made when the variable SB_Input is set to Hello_Request. The Master_Actions are performed upon this transition.

SB(11D): HASLAVEUPDATE—A transition back to the Active state is made when the THA timer expires, or when the variable SB_Input is set to Update_Response. The Update_Actions are performed upon this transition.

STATE SB5: BACKUP

The newly inserting HA-SBA applications enter the BACKUP state after the SB_Start signal is asserted. From this state the HA-SBA learns if a HA-SBA master and/or HA-SBA slave exists.

SB(50): STOPSBAMANAGER—A transition to the Standby state is made when the SB_Stop signal is asserted. The Init_Actions are performed on this transition.

SB(51): NEWHAMASTERPRESENT—A transition to the Active state is made when the variable SB_Input is set to Master.

SB(55A): PROCESSHELLORESPONSE—A transition back to the BACKUP state is made when the variable SB_Input is set to Hello_Request. The Hello_Actions are performed upon this transition.

SB(55B): SENDANOTHERHELLOREQUEST—A transition back to the BACKUP state is made when the THA expires. The Hello_Actions are performed upon this transition.

Update, Master and Hello actions are detailed as follows:

```
HELLO_ACTIONS:
/*SB(05) OR SB(55B)*/
IF(HA_Flag == SET)
    THEN
        BEGIN
            IF (Hello_cnt < N_Hello)
            THEN
                BEGIN
                    ibmPATHHA_Variable = HELLO_REQUEST
                    Transmit Hello Request
                    CLEAR HA_Flag
                    RESET THA
                    INC Hello_cnt
                END
            ELSE
            THEN
                BEGIN
                    /*Three Hello Requests without a*/
                    /*response, master doesn't exist*/
                    CLEAR Hello_cnt
                    CLEAR HA_Flag
                    SB_Input = MASTER
                    Queue    SRF    (    MasterPresent Notification)
                END
        END
/*SB(55A)*/
    /*IF(SB_Input == Hello_Response)
    THEN
        BEGIN
            IF (rcv'd slave addr != MLA)
            THEN
                BEGIN
                    SB_Input = NONE
                    signal SB_Stop
```

```
                                END
                        ELSE
                                THEN
                                        BEGIN
                ibmPATHHA_Master_Addr = rcv'd master addr
                                ibmPATHHA_Slave_Addr = my individual addr
Queue       SRF     (      Slave PresentNotification)
                                        END
                                END
MASTER_ACTIONS:
    /*SB(11C)*/
    /*HA-SBA Slave now exists,*/
    /*begin periodic updates*/
    IF(ibmPATHHA_Slave_Addr == NULL)
        THEN
                BEGIN
                        ibmPATHHA_Variable = HELLO_RESPONSE
                        ibmPATHHA_Slave_Addr = SA of rcv'd hello
request
                        RESET THA
                        Transmit Hello Response
                END
    /*HA-SBA Slave already known*/
    ELSE
        BEGIN
                ibmPATHHA_Variable = HELLO_RESPONSE
                Transmit Hello Response
        END
UPDATE_ACTIONS:
    /*SB(11D)*/
    /*Process Update_Response*/
    IF(SB_Input == Update_Response)
        THEN
                BEGIN
                        RESET Update_cnt
                END
    /*SB(11D)*/
    /*Process THA Expiration*/
    /*Send another Update Request*/
    ELSE IF (Update_cnt < N_Update)
        THEN
                BEGIN
                        Queue an Update Request Message
                        INC Update_cnt
        END
    /*SB(11D)*/
    /*Process THA Expiration*/
    /*Three Update Requests without a*/
    /*response, the HA-SBA Slave is gone*/
    ELSE
        THEN
                BEGIN
                        DISABLE THA
CLEAR                           Update_cnt.
                CLEAR                   ibmPATTHA_Slave_Addr.
        END
```

We claim:

1. A system for providing high availablity synchronous bandwidth allocation comprising an FDDI segment to which are connected a first device having means for allocating synchronous bandwidth over said FDDI segment to any requesting device, at least a second device having means for requesting synchronous bandwidth over said FDDI segment, and a third device said system being characterized in that it further comprises:

means in said first device and said third device for establishing communications and for exchanging between said first and third devices information regarding the allocation of synchronous bandwidth to said at least second device, and means in said third device for assuming the responsibility for providing synchronous bandwidth allocation if said first device fails.

2. The system according to claim 1, wherein communications between said first and said third devices is established at first regular time intervals.

3. The system according to claim 2, wherein information is exchanged at second regular time intervals.

4. The system according to claim 3, wherein said first time intervals are no less than 30 seconds and no greater than 2 minutes.

5. The system according to claim 4, wherein said second time intervals are no less than 3 minutes and no greater than 12 minutes.

* * * * *